United States Patent [19]

Day

[11] Patent Number: 5,193,958
[45] Date of Patent: Mar. 16, 1993

[54] COATING OF SCREWS

[75] Inventor: Robert H. Day, Berkshire, England

[73] Assignee: ITW Ltd., Windsor, England

[21] Appl. No.: 603,071

[22] Filed: Oct. 25, 1990

[51] Int. Cl.$^5$ .................. F16B 39/02; F16B 25/00
[52] U.S. Cl. ..................... 411/82; 411/387; 411/914
[58] Field of Search .............. 411/411, 386, 387, 903, 411/908, 914, 82, 258, 301, 302

[56] References Cited

U.S. PATENT DOCUMENTS

| | | | |
|---|---|---|---|
| 667,555 | 2/1901 | McGahan | 411/903 X |
| 2,321,414 | 3/1941 | Parker | 411/914 X |
| 3,355,205 | 11/1967 | Wagner et al. | 411/387 X |
| 3,711,347 | 1/1973 | Wagner et al. | 411/930 |
| 3,870,668 | 3/1975 | Fischer et al. | 411/937.1 X |
| 3,893,496 | 7/1975 | Wallace et al. | 411/930 X |
| 3,914,178 | 10/1975 | Fineran et al. | 411/930 X |
| 3,922,449 | 11/1975 | Bolger | 411/301 X |
| 4,362,450 | 12/1982 | Hasegawa et al. | 411/903 X |
| 4,428,982 | 1/1984 | Wallace | 411/258 X |
| 4,545,712 | 10/1985 | Wallace | 411/258 |
| 4,802,807 | 2/1989 | Offenburger et al. | 411/914 X |
| 5,000,636 | 3/1991 | Wallace | 411/258 |

FOREIGN PATENT DOCUMENTS

| | | | |
|---|---|---|---|
| 164195 | 7/1955 | Australia | 411/903 |
| 617081 | 3/1961 | Canada | 411/903 |

Primary Examiner—Rodney M. Lindsey
Attorney, Agent, or Firm—Schwartz & Weinrieb

[57] ABSTRACT

A method of making a screw threaded fastener (1, 10) for fixing cladding to a building includes the steps of applying a mastic covering (5, 15) to a screw threaded portion (4, 13) of the fastener, and applying a non-sticky protective coating (6, 16) to the outside of the mastic covering (5, 15) so as to prevent the fasteners (1, 10) from sticking together during handling and packaging of the same. Preferably the protective coating (6, 16) is as coating of a waxy substance and is applied to the outside of the mastic covering (5, 15) by means of a dipping or spraying process or operation. The fasteners are then easy to use and form a water-tight, moisture and vapor-proof seal with respect to their supports or substrates. The waxy coating (16) may also be applied to the drill point (12) so as to act as a lubricant during driving of the fastener.

12 Claims, 1 Drawing Sheet

COATING OF SCREWS

FIELD OF THE INVENTION

The present invention relates generally to fasteners and a method of making the same, and more particularly to a screw-threaded fastener to be used in connection with securing metal cladding to building frameworks, and a method of making such a fastener.

BACKGROUND OF THE INVENTION

Many modern industrial buildings are constructed by first constructing a strong steel framework and then cladding the same with thin profiled metal sheets so as to form the walls and roof.

It is also common practice to add insulation material to the walls and roof of the building so as to conserve energy and to help to maintain a comfortable environment within the building. This added insulation is usually sandwiched between the roof or walls and the framework as the roof and walls are connected to the underlying framework by using self-drilling, self-tapping screw-threaded fasteners. A typical building has many thousands of such fasteners.

Inside a typical air-conditioned building there is usually a small positive pressure which forces warm moist air from the interior of the building along the screw threads and into the wall and roof voids, as well as into the insulation material. The temperature outside of the roof void and the temperature gradient within the roof void vary according to location, the time of year and the time of day but, frequently, the void will be cooler than the inside of the building.

The warm air from the building therefore cools within the roof and wall voids and consequently moisture condenses. This condensation typically reacts with chemicals present within the insulation material so as to form an acid which subsequently attacks the fastenings. This chemical or corrosive attack can lead to very severe corrosive deterioration of the fastenings and the structural integrity of the associated structural framework and network. Alternatively, condensation can accumulate and saturate the insulation so as to reduce its thermal efficiency. In the most severe cases, the condensation flows back into the building and gives the impression of being leakage.

Corrosion is a frequent cause for concern in connection with mechanical fastenings, particularly corrosion caused by the use of dissimilar metals which are widely used in the metal building construction industry. The most severe situation occurs when a conducting electrolyte, such as, for example, acidified water, accumulates at a junction defined between the fastening and the metal framework or profiled sheet. The resulting corrosion is caused by means of a galvanic reaction which occurs between the dissimilar metals.

At present a cadmium coating is often applied to the underlying fastener and this coating acts as both an anti-corrosion coating and as a solid lubricant. However, this is not preferred from a pollution standpoint and therefore a zinc anti-corrosion coating is preferred. This type of coating, however, tends to ball up and jam the drilling and self-tapping effect of the fastener.

In order to overcome the problems of corrosion we have coated a proportion of the screw threads, and sometimes the drill point, of such a fastener with a mastic coating which acts as a sealant at the junction of the screw and the metal framework or profiled sheet so as to prevent the ingress of moist air and which also serves as a protective coating against galvanic corrosion of the fastener. The mastic coating is applied to the fasteners either by means of dipping them point first into a supply of the mastic or by rolling a band of mastic around the screw thread.

Having applied the mastic, the screws are then rapidly passed into an infra-red conveyor oven so as to cure an outer layer thereof and form a skin, and are subsequently cooled by means of an air blast or are water quenched.

If the fasteners are coated and packed without performance of this preliminary curing step they stick together and form an unusable mass. This process is very sensitive to temperature and the curing time. In addition since the resin is partially cured at the skin or surface, curing or cross-linking of the remainder of the mastic continues very slowly and this means that the product has only a limited shelf-life.

SUMMARY OF THE INVENTION

According to a first aspect of the present invention a method of making a screw threaded fastener includes the steps of applying a mastic covering to a screw threaded portion of the fastener, and applying a non-sticky protective coating to the outside of the mastic covering so as to prevent the fasteners from sticking together during handling and packaging of the same.

Preferably the protective coating comprises a coating of a waxy substance and is applied to the outside of the mastic covering by means of dipping or spraying processes.

According to a second aspect of this invention, a screw threaded fastener includes a mastic covering disposed around a screw threaded portion of the fastener, and a waxy coating covering the outside of the mastic covering so as to prevent the fastener from sticking to similar fasteners during handling and packaging of the fasteners.

Preferably the waxy coating is impervious to the transmission of solvents from the mastic covering to the atmosphere, the transmission of gas such as, for example, oxygen which reacts with the mastic covering, and to the transmission of ultra violet light. In this way the wax coating not only prevents fasteners from sticking to one another but also protects the mastic covering from deterioration and thus increases the shelf-life of the fasteners.

According to a third aspect of this invention a screw threaded fastener includes a drill point and a waxy material coating the drill point.

We have found that the application of a waxy coating material to the drill point of the fastener acts as a lubricant as the drill point of the fastener enters an underlying purlin and, even if the fastener is zinc coated, the insertion of the fastener is facilitated.

Preferably the waxy material has a melting point above 50° C. and it is particularly preferred that its melting point is above 60° C. Preferably the waxy material also has a low shrinkage factor so that it does not shrink and crack so as to undesirably expose the mastic covering disposed therebeneath. Examples of suitable waxy materials are microcrystalline waxes, and a blend of microcrystalline wax and a wax known as Epolene. Such a material adheres very well to the drill point and screw thread and resists being displaced by means of a centrifugal action so that it acts as a lubricant throughout the fastener driving operation.

Preferably the mastic covering is a non-curing type of mastic such as, for example, a general purpose butyl rubber based sealant or a silicone based sealant such as, for example, that sold under the name Silite. It may also be of the curing type such as, for example, an epoxy based plastic resin material sold under the Registered Trade Mark TENABOND. The mastic materials or compositions may include corrosion resisting fillers such as, for example, zinc, aluminum or magnesium for protecting steel against galvanic action by means of providing a sacrificial anode therefor.

The mastic covering may be applied in generally the same way as that described above. Alternatively, it is applied by means of a dipping or spraying process or operation but preferably the fastener is inserted into a mold and then the mastic material is injected into the mold cavity and is formed around the fastener.

In the case of small diameter fasteners including a drill point for drilling through thick metal it is desirable that the drill point flutes are not blocked or obstructed by means of the mastic covering so as to maintain the drilling performance. In the past this has been achieved by means of rolling the mastic material onto the fastener. However, by means of a preferred method developed in accordance with this invention, the drill point of the fastener is initially coated with a preliminary waxy coating before the mastic covering is applied thereto. The mastic material does not adhere to the preliminary waxy layer, but only adheres to those parts of the fastener which are not wax coated. The wax disposed upon the drill point of the fastener can then either be left in position or it can be removed by means of dipping the drill point of the finished product into a hot oil bath so as to render the point clean. An outer waxy layer is then applied over the mastic covering and the drill point. This method avoids rolling the mastic material onto the fastener and avoids drill point contamination during application of the mastic material. The preliminary waxy coating and/or the outer waxy layer acts as a fusible lubricant during driving of the fastener.

The proposed invention requires less complicated mechanization, there is no need for an accurately controlled conveyor oven, and thus the equipment is more compact and less difficult to control.

Preferably the or each waxy coating is applied with the waxy material being heated to a temperature level above its melting point. Preferably the fasteners are subjected to a water or forced air quench process or operation after the or each application of the waxy material so as to ensure that the material has cooled sufficiently so as to form a hard coating before adjacent fasteners come into contact with one another. Multiple layers of mastic material may be built up one on top of the other, or different materials may be located at different locations along the fastener by repeating the mastic application steps outlined above.

BRIEF DESCRIPTION OF THE DRAWINGS

Particular examples of screw threaded fasteners in accordance with this invention will now be described with reference to the accompanying drawings, in which like reference characters designate like or corresponding parts throughout the several views, and wherein.

DETAILED DESCRIPTION OF THE ILLUSTRATED EMBODIMENT

Figure 1:
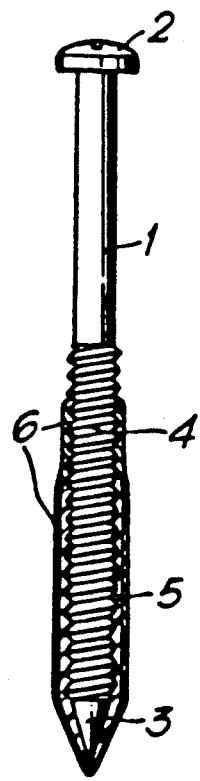
FIG. 1 is a partially sectioned side elevation of a first embodiment of the present invention.
Figure 2:
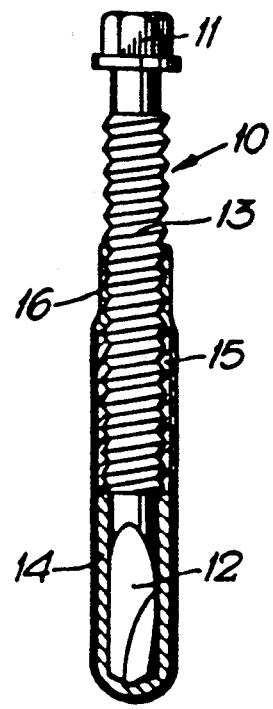
FIG. 2 is a partially sectioned side elevation of a second embodiment of the present invention.
Figure 3:
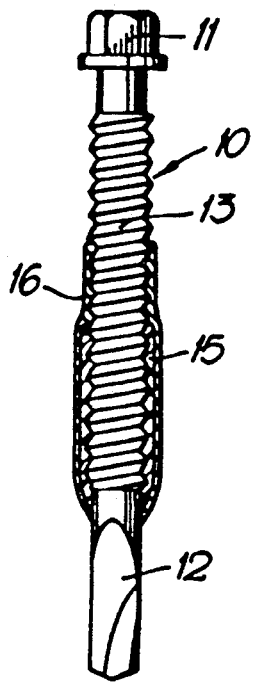
FIG. 3 is a partially sectioned side elevation of a third embodiment of the present invention.

In accordance with the first embodiment of the present invention a fixing screw 1 has a domed head 2, a pointed self-drilling point 3 and a screw-threaded portion 4. Such screws are typically used in connection with clamping plates so as to secure insulating material to a thin underlying metal sheet. The lower portion of the screw thread 4 and drill point 3 are dipped at room temperature into a mastic material such as, for example, a general purpose butyl sealant type ID152 marketed by Induseal Developments. This provides a mastic coating 5 around the drilling point 3 and the lower portion of thread 4 of the screw 1. The screws are subsequently dipped within a microcrystalline wax type 180 MH manufactured by Witco Corp. of USA, and distributed by Eggar, of Theale, Berkshire, U.K. having 2% of a modifier wax known as Epolene C16 or NN34 manufactured by Eastman Kodak Products Inc. added to it. The wax is retained at a temperature of 120° C. The screws are removed from the wax bath and dipped into cold water so as to cool the wax to a temperature level which is below its melting point of 60° C. so as to form a relatively hardened non-sticky coating 6 over the outside of the mastic covering 5. Typically the fasteners 1 are conveyed by means of a belt conveyor which engages the fasteners beneath their heads 2 and leads them successively through a bath containing the mastic material, a bath containing the molten wax and the water quench.

The second example of a screw threaded fastener developed in accordance with this invention is designated by means of the reference character 10 and includes a hexagonal head 11, a drill point 12 and a screw thread 13. The basic fastener is of the type that is sold by ITW Buildex under their registered trade mark TEKS. The drill point 12 is dipped into a first bath containing molten wax. After removal from the bath the fastener 10 is cooled by means of an air quench so as to cool the wax adhering to the drill point 12 so as to provide a solid wax coating 14 upon the drill point 12. The fastener 10 is then dipped into a bath of mastic material and withdrawn. The mastic material does not adhere to the wax coating 14 but does adhere to the non-coated lower portions of the screw thread 13 so as to provide a band of mastic material 15 upon the lower screw threaded portion of the fastener. The preliminary wax coating 14 may be optionally be removed by means of dipping the drill point 12 into a hot oil bath. The fastener 10 is subsequently dipped into a molten bath of micro-crystalline wax type 180 MH having 2% of a modifier wax known as Epolene added to it. The wax is maintained at a temperature of 120° C. This provides a wax coating around the outside of the mastic covering 15 and the preliminary wax 14 where this is retained. This outer wax coating is cooled to a temperature level which is below its melting point by means of an air or water quench. Again the fastener will typically be conveyed by means of a conveyor belt which is engaged beneath its head 11 while it is engaged between the various baths and quenches. The preliminary wax coating 14 and/or wax coating 16 typically melt a the drill point 12 of the fastener drills through a steel purlin, the wax coatings serving as a lubricant during the drilling process.

The third example in accordance with the present invention is generally similar to the second example but, in this example the drill point 12 is subsequently dipped into a hot oil bath so as to remove both the preliminary wax coating 14 and the outer wax coating 16 from the drill point in order to leave the drill point 12 and its flutes completely free from wax.

Figure 4:
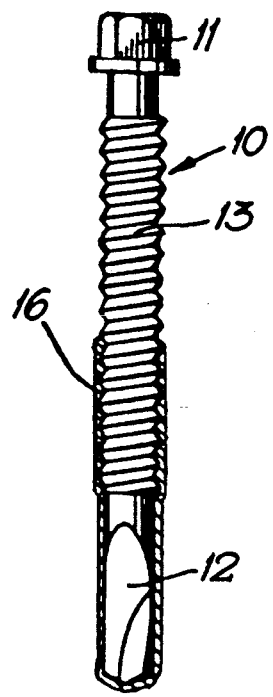
FIG. 4 is a partially sectioned side elevation of a fourth embodiment of the present invention.

The fourth example of the present invention is shown in FIG. 4 and comprises a fastener 10 similar to that in the second and third examples. The fastener is zinc plated so as to enhance its corrosion resistance. The drill point 12 and the lowest threaded portions of the screw thread 13 are coated with wax 16 by being dipped into a molten bath of microcrystalline wax type 180MH and 2% of Epolene which is maintained at a temperature of 120° C. Upon subsequent cooling by means of an air or water quench the wax 16 solidifies so as to form a solid coating upon the fastener.

Upon driving a fastener in accordance with the first, second and fourth examples of the present invention, the heat generated by means of the tip of the fastener during penetration of an underlying purlin melts the wax 16 and the melted wax therefore acts as a lubricant for the subsequent self tapping operation of the fastener. This facilitates the driving of the fastener and overcomes any tendency of a zinc coating to "ball up" and resist the driving of the fastener. This type of wax 16 also clings tightly to the fastener so that it is not displaced by means of the centrifugal action developed during the drilling operation.

Obviously, many modifications and variations of the present invention are possible in light of the above teachings. It is therefore to be understood that within the scope of the appended claims, the present invention may be practiced otherwise than as specifically described herein.

I claim:

1. A screw threaded fastener, comprising:
   a screw threaded portion defined upon a shank of said fastener;
   an uncured, tacky mastic covering disposed around said screw threaded portion of said fastener for providing corrosion-prevention and sealant properties to said fastener when said fasten is threadedly engaged within a substrate; and
   a waxy coating covering said uncured, tacky mastic disposed upon said screw threaded portion of said fastener so as to prevent said fastener from sticking to similar fasteners during handling and packaging of said fasteners by rendering outer peripheral portions of said fasteners non-tacky and for preventing deterioration of said uncured, tacky mastic covering.

2. A fastener according to claim 1, wherein said waxy coating is substantially impervious to the transmission of solvents from the mastic to the atmosphere, the transmission of gas such as oxygen which reacts with said mastic, and to the transmission of ultra violet light.

3. A fastener according to claim 1, wherein said mastic includes a corrosion resisting filler.

4. A fastener according to claim 3, wherein said corrosion resisting filler is selected from a group consisting of zinc, aluminium and magnesium.

5. A fastener according to claim 1, wherein said waxy material has a melting point above 50° C.

6. A fastener according to claim 1, wherein said waxy material comprises a microcrystalline wax.

7. A fastener according to claim 1, wherein said waxy material has a melting point above 60° C.

8. A fastener as set forth in claim 1, wherein said mastic covering comprises a non-curing type mastic.

9. A fastener as set forth in claim 8, wherein said non-curing type mastic comprises a butyl rubber based sealant.

10. A fastener as set forth in claim 8, wherein said non-curing type mastic comprises a silicon based sealant.

11. A fastener as set forth in claim 1, wherein said mastic covering comprises a curing-type mastic.

12. A fastener as set froth in claim 11, wherein said curing-type mastic comprises an epoxy based plastic resin material.

* * * * *